United States Patent [19]

Verley

[11] 4,386,888
[45] Jun. 7, 1983

[54] DOUBLE DIAPHRAGM OPERATED REVERSING VALVE PUMP

[75] Inventor: Donald J. Verley, Valencia, Calif.

[73] Assignee: McCann's Engineering and Manufacturing Company, Los Angeles, Calif.

[21] Appl. No.: 191,527

[22] Filed: Sep. 29, 1980

[51] Int. Cl.³ .............................................. F04B 43/06
[52] U.S. Cl. .................................. 417/393; 417/395; 91/311; 91/313; 91/323
[58] Field of Search ...................... 417/393, 395, 397; 91/311, 313, 323, 329, 348

[56] References Cited

U.S. PATENT DOCUMENTS

| Re. 7,420 | 12/1876 | Cameron | 91/313 X |
|---|---|---|---|
| 16,358 | 1/1857 | Fletcher | 91/313 |
| 400,401 | 3/1889 | Gutzkow | 91/323 X |
| 2,679,209 | 5/1954 | Fischer et al. | 417/395 X |
| 2,780,177 | 2/1957 | Hoenecke | 91/313 X |
| 2,942,554 | 6/1960 | Gilchrist | 91/323 X |
| 3,064,582 | 11/1962 | Knights | 417/393 X |
| 3,791,768 | 2/1974 | Wanner | 417/393 |
| 3,838,946 | 10/1974 | Schall | 417/395 |
| 4,123,204 | 10/1978 | Scholle | 417/393 |

Primary Examiner—Leonard E. Smith
Attorney, Agent, or Firm—Lyon & Lyon

[57] ABSTRACT

A reciprocating fluid pump has a dual piston element and dual diaphragms in fluid communication therewith. Full movement of the dual piston element in either direction of movement causes movement of a pilot valve which simultaneously vents a first working chamber located in the direction of movement of the dual piston element and occasions reciprocating movement of the dual diaphragms, thereby directing a pump power medium to a second working chamber to cause movement of the dual piston element in the opposite direction.

14 Claims, 5 Drawing Figures

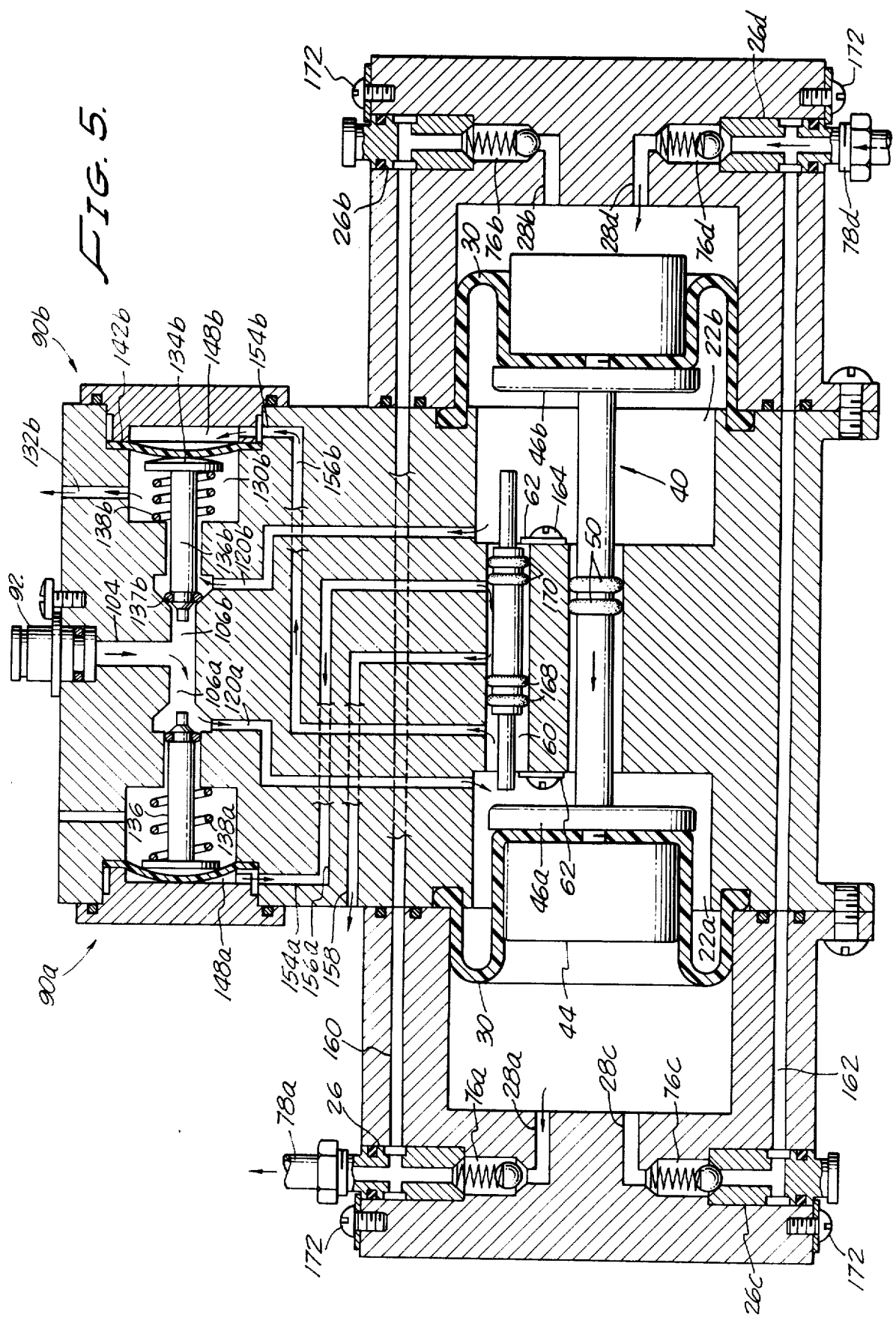

DOUBLE DIAPHRAGM OPERATED REVERSING VALVE PUMP

BACKGROUND OF THE INVENTION

This invention relates generally to pumps and in particular to those useful in the dispensing of fluids of the type found in vending machines.

Pumps of this nature are normally reciprocating in operation and comprise dual opposing chambers which alternately fill and void thereby facilitating the desired pumping operation. More specifically there is characteristically provided opposing inlet and outlet orifices in fluid communication with the dual pumping chambers, the orifices being provided with check valves which permit only unidirectional fluid flow. A pilot valve or similar structure is useful in redirecting a pump power medium thereby facilitating the reciprocating action of the fluid pump. It is well known that pumps of this nature, because of their reciprocating movement, are often prone to stall conditions thereby requiring some attendance.

Other pumps of this nature include motor-driven devices wherein a cam-type drive mechanism operates the reciprocating piston element thereby facilitating the pumping operation. It is well known that in pumps of this nature there is required certain pressure sensing and pressure relief devices to guard against harmful pressure peaks and their possible harmful effect on downstream components.

SUMMARY OF THE INVENTION

The invention of the present application solves many of the problems existent in these prior reciprocating fluid pumps.

Briefly, the invention employs a center block having two end bells in an opposing parallel relationship. The end bells have located therein fluid pumping chambers through which a dual piston element moves in a reciprocating manner thereby causing alternate filling and voiding of the pumping chambers. The center block has dual working chambers through which a portion of the dual piston element passes under action of a pump power medium. In fluid communication with the working chambers are dual slave diaphragms, each of which has a spring-type energy storage system operatively associated therewith. The slave diaphragms, under action of the pump power medium, cause stems having sealing members integral therewith to direct the pump power medium to alternate working chambers thereby facilitating the reciprocating movement of the dual piston element and the respective filling and voiding of the pumping chambers.

The center block also has a pilot valve disposed between the working chambers. The pilot valve is activated by full movement of the dual piston element in either direction of movement. Full movement of the pilot valve occasions venting of one slave chamber and filling of the other slave chamber which causes reciprocating movement of the spring loaded slave diaphragms within their respective slave chambers. Each slave diaphragm as stated previously has a stem member in association therewith which alternately directs the flow of the pump power medium to the working chambers. In this manner the reciprocating operation of the pump is achieved without the potential hazards associated with pressure peaks. The dual slave diaphragms are also useful in eliminating the possibility of pump stall, wherein some attendance would be necessary. Moreover, there is a complete separation of the pump power medium from the fluid being pumped.

It is therefore the principal object of the present invention to provide a reciprocating pump having an external energy storage mechanism which alternately activates the opposing pumping chambers.

It is another object of the present invention to provide dual reciprocating slave diaphragms designed to eliminate the possibility of stall occurring in the reciprocating pump.

It is another object of the present invention to provide a motorless reciprocating pump having a pump power medium completely separated from the fluid being pumped.

It is another object of the present invention to have a pilot valve in fluid communication with the dual slave diaphragms wherein the pilot valve causes a shift in the orientation of the dual slave diaphragms thereby redirecting the pump power medium to accomplish the reciprocating movement of the pumping elements.

These objects and advantages of the present invention will become more apparent during the course of the following description and in the accompanying drawings, wherein:

DESCRIPTION OF THE DRAWINGS

FIG. 5 is a schematic view of the assembled reciprocating pump illustrating the fluid communication between the working chambers, the dual slave diaphragm chambers and the pilot valve.

DESCRIPTION OF THE PREFERRED EMBODIMENT

Figure 1:
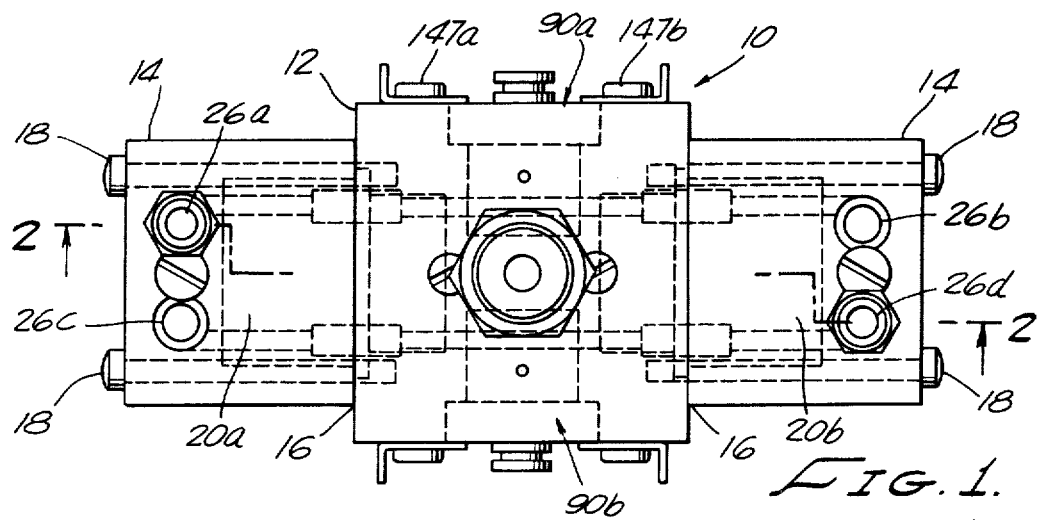
FIG. 1 is a top perspective view of the reciprocating pump illustrating the opposing pumping chambers and dual slave diaphragm chambers.

As shown in FIG. 1, the invention of the present application comprises a reciprocating pump 10 having a center block 12 connected to opposing end bells 14 in a substantially parallel and T-shaped configuration. Between the center block 12 and end bells 14 there may be present sealing gaskets 16 or the like so disposed as to prevent leakage of the pump power medium (not shown) or the fluid (not shown) being acted upon by the reciprocating pump 10. The center block 12 and end bells 14 are secured together by set screws 18 or by other conventional mechanisms which may include bolts with nuts and washers oriented in a manner so as to provide structural integrity to the reciprocating pump 10. The screws 18 or other fastening mechanisms should be of the nature that they are removable thereby facilitating the repair or replacement of the internal components of the reciprocating pump 10.

Figure 2:
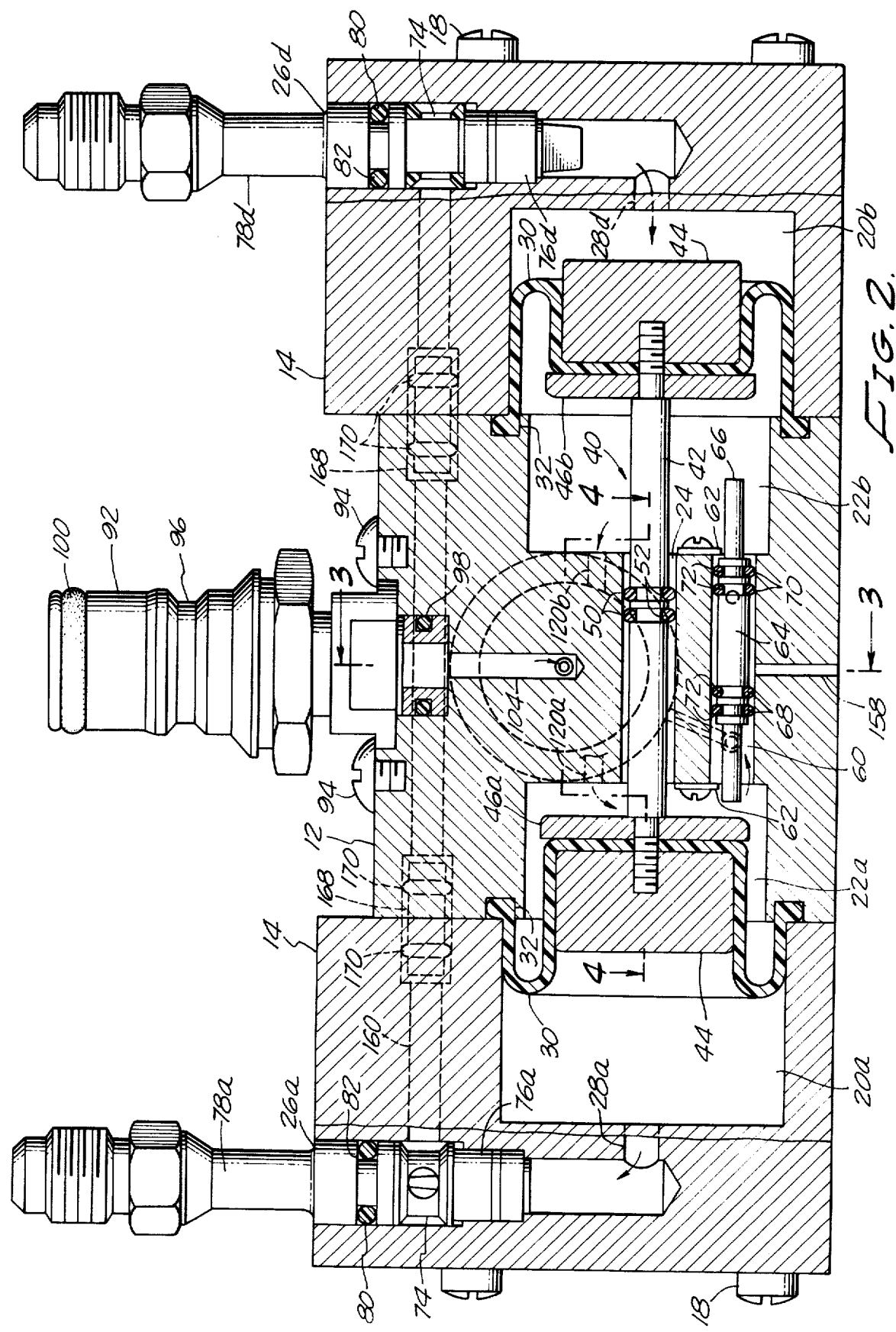
FIG. 2 is a side cross-sectional view of the reciprocating pump illustrating the pilot valve, the opposing pumping chambers and the inlet/outlet orifices.

In FIG. 2, the end bells 14 and center block 12 define two pumping chambers 20a, b disposed substantially medially within the end bells 14. The center block 12 also defines two working chambers 22a, b interconnected by a guide hole 24 which passes entirely through the center block 12. The working chambers 22a, b are coaxial with the pumping chambers 20a, b and with the guide hole 24 which is disposed substantially in the center of the working chambers 22a, b. It should be noted that the working chambers 22a, b, the pumping chambers 20a, b, and the guide hole 24 are of a substantially cylindrical shape in the preferred embodiment however other configurations are possible.

As best shown in FIG. 5, but also shown in FIG. 2 in part, interconnected with the pumping chambers 20a, b are multiple orifices 26a, b, c, d, each of which is adapted to direct flow either from or into the respective pumping chambers 20a, b. As shown in FIGS. 2 and 5, the orifices 26a, b, c, d, are in fluid communication with the pumping chambers 20a, b by channels 28a, b, c, d, disposed along the external substantially circular surfaces of the pumping chambers 20a, b. The orifices 26a, b, c, d may be oriented in a manner such that the direction of fluid communication between the pumping chambers 20a, b and the external area about the reciprocating pump 10 is either on the same side of the end bells 14 or on opposite sides. Referring to FIGS. 1 and 2, in the preferred embodiment the orifices 26a, b, c, d are in an aligned configuration and communicate fluid from the pumping chambers 20a, b through the same sides of the end bells 14.

It should be noted that the reciprocating pumps 10 of the present invention are composed primarily of a plastic composition which is machined in a manner such as to create the various pumping chambers 20a, b, orifices 26a, b, c, d, working chambers 22a, b and guide hole 24. Although plastic is utilized in the preferred embodiment, because of its low cost and light weigh, it is possible to utilize metal or other compositions without departing from the spirit of this invention. Indeed, when pumping certain fluids dilaterious to plastics, non-corosive metal is preferred.

In FIG. 2, the invention of the present application is magnified and shown in cross-section. Disposed between the center block 12 and end bells 14 are multiple diaphragms 30, which are seated in circumferential grooves 32 formed within the center block 12. The diaphragms 30 are made of a flexible material such as rubber or a composite thereof and may be glued or attached by other conventional means to the center block 12 in a manner that a seal is formed between the respective working chamber 22a, b and pumping chambers 20a, b. The diaphragms 30 should be of a sufficient size that when fully extended they are able to cover the internal area of the respective pumping chambers 20a, b. Although the diaphragms 30 are shown affixed within the center block 12 in the preferred embodiment, it should be noted that the diaphragms 30 may also be secured within a slot (not shown) in the respective end bells 14 and thereby accomplish the same result.

Also shown in FIG. 2 is a dual piston element 40 which has a center rod 42 interconnecting two opposing pistons 44. The diaphragms 30 are separately affixed between the pistons 44 and two substantially cylindrical discs 46a, b which are also secured to the center rod 42 thereby further facilitating the sealing of pumping chambers 20a, b from the working chambers 22a, b. The external diameters of the pumping chambers 20a, b should be slightly greater than the diameter of the discs 46a, b to facilitate movement of the diaphragms 30 upon reciprocating motion of the dual piston element 40. The discs 46a, b may be made of a plastic-type material, however, in the preferred embodiment they are a metal, such as aluminum, thereby providing great durability and low weight to the reciprocating pump 10 of the present invention. Although in the preferred embodiment the discs 46a, b and pistons 44 are shown screwed onto the center rod 42, they may be fastened in other manners such as by set screws or pins. The dual piston element 40 is adapted to reciprocate within the area provided by the working chambers 22a, b and pumping chambers 20a, b. The center rod 42 moves horizontally within the guide hole 24 and has multiple o-rings 50 disposed thereabout thus separating the opposing working chambers 22a, b. The o-rings 50 are located within spaced apart circumferential slots 52 disposed upon the periphery of the rod 42. In this matter the opposing working chambers 22a, b are sealed from each other, thus facilitating the independent operation of the pumping chambers 20a, b of the reciprocating pump 10 of the present invention.

Also located within the center block 12 is a pilot valve channel 60 with washers 62 affixed at the ends thereof in a manner that sections of the washers 62 cover a portion of the valve channel 60. The valve channel 60 extends between the working chambers 22a, b and contains a pilot valve 64, which has two branches 66 of a slightly smaller diameter than the valve 64 and extending outwardly therefrom. The pilot valve 64 has first pair of o-rings 68 and a second pair of o-rings 70 disposed circumferentially about the periphery of the pilot valve 64 within aligned slots 72. The pilot valve 64 is adapted to traverse horizontally within the channel 60 upon contact between the branches 66 and either of the discs 46a, b of the dual piston element 40. Movement of the pilot valve 64 is restricted by the presence of the washers 62 at the ends of the channel 60. The o-rings 68 and 70 are placed along the pilot valve 64 in a manner that traversal of the pilot valve 64 to its furthest extent in either direction of movement will alternately occasion venting of the respective working chambers 22a, b as illustrated in FIG. 5.

As shown in FIGS. 2 and 5, within the orifices 26a, b, c, d are located one or more bushings 74 and unidirectional check valves 76a, b, c, d. Projecting outwardly from the orifices 26a, d are detachable nozzles 78a, d which each have an o-ring 80 located within a groove 82 thereby sealing the internal portions of the orifices 26a, d from the external area about the end bells 14. Although in the preferred embodiment one bushing 74 is shown in each orifice 26a, d, it is also possible to use two or more bushings depending upon the desired placement of nozzles 78a, d in the orifice 26a, d. The bushings 74 are of the type that permit movement of fluid within the orifices 26a, d. In this manner unidirectional fluid communication is achievable between the pumping chambers 20a, b and the nozzles 78a, d. It should be noted that nozzles 78a, d may be provided in any other orifice 26b, c, depending upon the desired operation of the pump 10 and orientation of upstream or downstream vending machine components.

Figure 3:
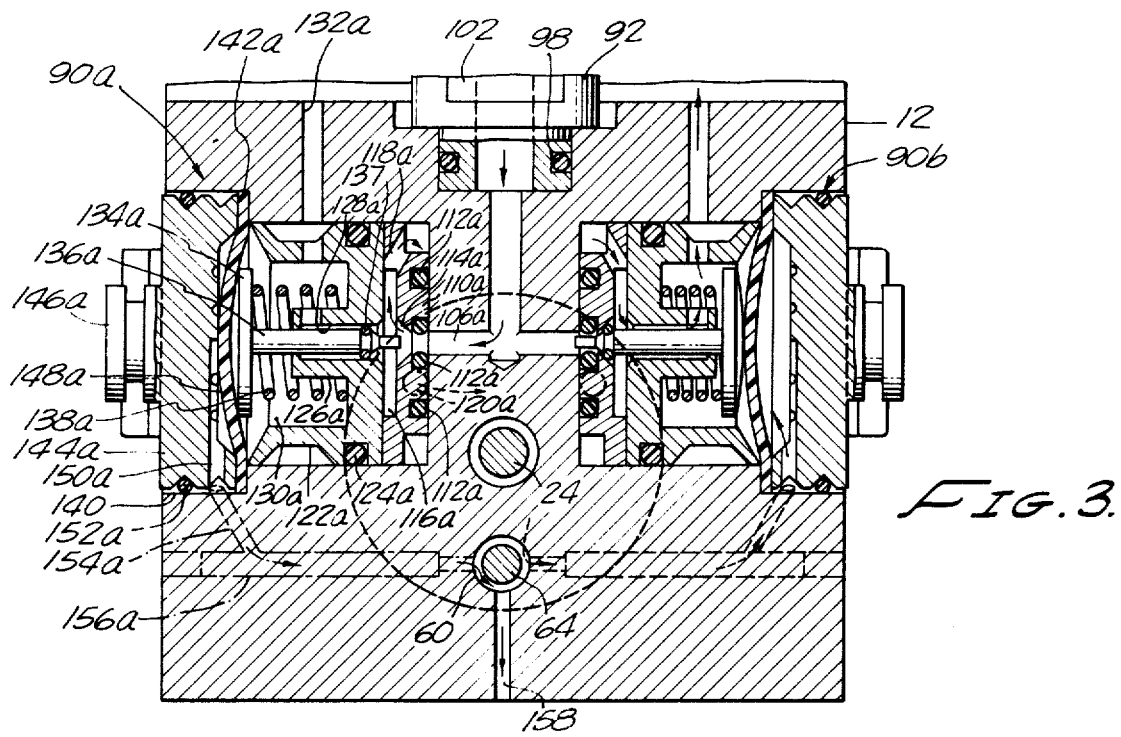
FIG. 3 is a cross-sectional view of the dual slave diaphragms and associated stems.

As shown in FIGS. 1 and 3, disposed within the center block 12 upon opposite sides of the guide hole 24 and slightly elevated therefrom are opposing first and second diaphragm chambers 90a, b. In the preferred embodiment the diaphragm chambers 90a, b are aligned substantially perpendicular to the axis passing through the guide hole 24 and working chambers 22a, b. An input nozzle 92, shown graphically in FIG. 3, and actually in FIG. 2, is secured to the center block 12 by retaining screws 94 and provides for the supply of a pump power medium to drive the reciprocating pump 10 of the present invention. Conventional means (not shown) are provided within the nozzle 92 for assuring unidirection flow of the power medium into the pump 10 and these means may be check valves or other similar structures. As best shown in FIG. 2, a groove 96 is adapted to secure supply hoses of fittings (not shown) to the nozzle 92 and a sealing o-ring 98 prevents dilaterious power medium fluid loss. In FIG. 2, a second o-ring 100 seals the nozzle 92 to the supply hoses (not shown) or associated fittings (not shown).

In FIG. 3, extending downwardly from the nozzle 92 and coaxial with a nozzle supply channel 102 is a main input channel 104 which has first and second branches 106a, b adapted to supply power medium to the respective diaphragm chambers 90a, b. The diaphragm chambers 90a, b are identical in construction and operation, consequently only one chamber 90a will be described in great detail. The designation "a" will be used for components of chamber 90a and it is hoped that the reader will be able to equate the designation "b" for associated structures of chamber 90b.

Figure 4:
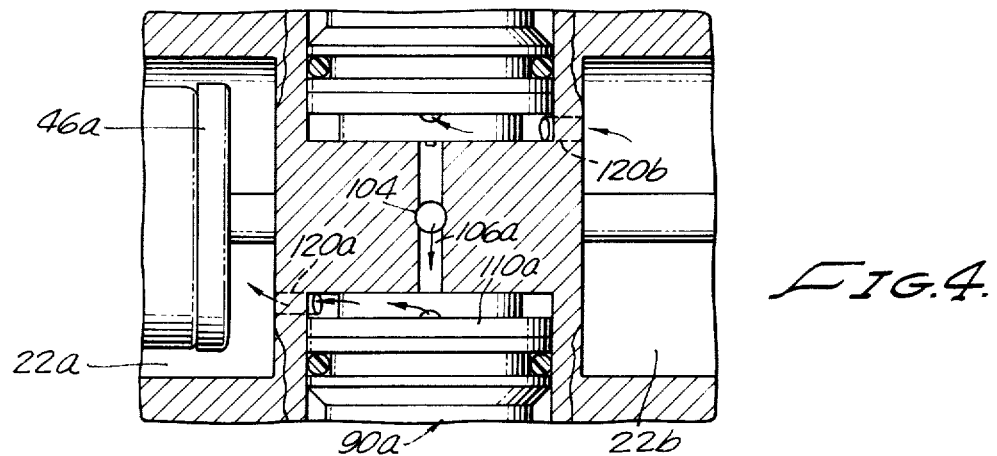
FIG. 4 is a cross-sectional view of the pump power medium movement within the slave diaphragm chambers of the reciprocating pump.

Disposed within the innermost portion of the chamber 90a is a directing block 110a which has multiple o-rings 112a integral therewith and adapted to seal the interior portions of the chamber 90a from the power medium except as necessarily provided herein. The directing block 110a has a sloping input channel 114a which opens into a recessed substantially circular opening 116a. Radially extending from the opening 116a is a channel 118a which opens into a duct 120a. As shown in FIGS. 3 and 4, the duct 120a passes through the center block 12 and opens into the working chamber 22a. In this manner the power medium entering the nozzle 92 is directed toward the working chamber 22a under the appropriate conditions as will be described hereinafter.

Abutting the directing block 110a is a retaining block 122a which has an o-ring 124a disposed thereabout adapted to seal and affix the block 122a within the chamber 90a. A stem retainer 126a is located substantially in the center of the block 122a and has passing therethrough a stem channel 128a. The cavity 130a formed within the retaining block 122a is open to the atmosphere about the pump 10 by a vent 132a. A piston head 134a is secured to a stem 136a which is adapted to traverse in a reciprocating manner within the stem channel 128a. Attracted to the stem 136a is an o-ring 137a which will facilitate sealing of the channel 120a from the channel 106a when the stem 136a is in the most recessed position. Engaging the head 134a and disposed about the stem 136a and stem retainer 126a is a spring 138a which is adapted to impart a continuously outward extending force upon the head 134a and stem 136a. The retainer 126a is designed to terminate movement of the piston head 134a and stem 136a in the direction of movement toward the main input channel 104. The o-ring 137a is attached to the end of the stem 136a opposite the piston head 134a to permit power medium passage through the channel 128a when the stem 136a is in its furthest point of travel toward the input channel 104.

Engaging the center block 12 and disposed within the central portion of a cylindrical cavity 140a is a slave diaphragm 142a which is flexible in a nature and preferably made of a material such as rubber. The cavity 140a is slightly larger in diameter than the retaining block 122a so as to provide sufficient support for the slave diaphragm 142a against the block 12. The diaphragm 142a is held in place against the block 12 by a plug 144a which has an outwardly extending member 146a for removal of the plug 144a from the cavity 140a. As shown in FIG. 1, the plug 144a is secured within the cavity 140a by the action of multiple fasteners 147a which enter the center block 12.

The plug 144a has a cavity 148a formed in its centermost portion to permit outward expansion of the diaphragm 142a under action of the spring 138a in the absence of the power medium. A channel 150a passes through the plug 144a to permit passage of the power medium into the cavity 148a and an o-ring 152a prevents passage of the power medium out of the pump 10 via the cavity 140a. Coaxial with the channel 150 a is a bore 154a which leads to an artery 156a. The artery 156a opens into the pilot channel 60 which has a vent 158 bored through the block 12 to permit passage of the power medium out of the pump 10 when the pilot valve 64 is in a certain alignment as described hereinafter.

In FIG. 4, the dual diaphragm chambers 90a, b are shown in a top cross-sectional view with the power medium flow from the chamber 90a into the working chamber 22a depicted. Also shown is the evacuation of the chamber 22b through the duct 120b.

In FIG. 5, a schematic of the present invention is depicted illustrating the fluid communication between the working chambers 22a, b, the diaphragm chambers 90a, b and the pilot channel 60. As indicated previously, the duct 120a permits flow of the power medium into the working chamber 22a when the stem 136a is in the recessed position under action of the spring 138a. When the stem 136b is in the forward position under action of the power medium and diaphragm 142b, the channel 120b permits flow of power medium from the working chamber 22b into the cavity 130b and out the vent 132b. Also shown schematically is the channel 156a extending between the cavity 148a and pilot channel 60. It should be noted that the channels 156a and 156b are spaced along the pilot channel 60 in a manner that fluid communication between the vent 158 and each channel 156a, b is separately achievable depending upon the placement of the pilot valve 64. As stated previously, the vent 158 permits a flow from the pilot channel 60 out of the center block 12 to the atmosphere surrounding the reciprocating pump 10.

The communicating channels 160 and 162 are shown as providing fluid communication between the orifices 26a, b and 26c, d respectively. Although not necessary, within the communicating channels 160 and 162 as shown in FIG. 2, there is located a sleeve 168 with multiple o-rings 170 integral therewith. This configuration assures that no fluid passing through the communication channels 160 and 162 will be permitted to seep between the center block 12 and end bells 14.

Positioned within the working chambers 22a, b are brace screws 164 which are secured to the vertical walls of the center block 12 associated with the working chambers 22a, b. The screws 164 terminate movement of the discs 46a, b at the centermost portion within each working chamber 22a, b. Lastly, orifice plugs 166 are shown in the orifices 26b, c wherein no fluid passage is desired, with securing members 172 holding all plugs 166 and nozzles 78a, d in the orifices 26a, b, c, d.

Because of the complex operation of the apparatus of the reciprocating pump 10 of the present invention, it is schematically illustrated in FIG. 5. Briefly, upon demand, a power medium normally consisting of high pressure air will be permitted to enter the pump 10 through the nozzle 92. This high pressure gas is supplied from external sources (not shown) and may be activated by conventional structures, such as an on/off valve, as found in vending machines, or other appropriate dispensing apparatus'.

The high pressure air or other gas will then pass through the input channel 104 and into the channels 106a, b. Although not shown in FIG. 5, because of the presence of the springs 138a, b the stems 136a, b will be forced into a position wherein the power medium will simultaneously pass into the channels 120a, b and then into the working chambers 22a, b. However, because the pilot valve 64, upon termination of its previous cycle, is always oriented in its furthest direction of travel toward either working chamber 22a or 22b, o-rings 68 and 70 disposed about the valve 64 will direct filling of only one of the cavities 148a, b. In FIG. 5, because of the position of the pilot valve 64, the power medium is shown passing through the channel 156b and into the cavity 148b thus causing the diaphragm 142b to push against the head 134b and shift the stem 136b, thus closing off the channel 120b from the channel 106b. The action occasions venting of the chamber 22b. As illustrated in FIG. 5, the power medium will then pass exclusively into the channel 120a and ultimately to the working chamber 22a, which will cause expansion of the diaphragm 30 and thus movement of the disc 46a and piston 44. This movement of the piston 44 and diaphragm 30 forces any fluid in the pumping chamber 20a to pass through the associated orifice 26a, check valve 76a and finally out the nozzle 78a. Although the communicating channel 160 permits passage of fluid to the orifice 26b no fluid will pass into the pumping chamber 20b because of the unidirectional check valve 76b. Similarly, no fluid will pass into the channel 162 because of the check valve 76c.

As stated earlier, the filling of the cavity 148b causes the stem 136b and its o-ring 137b to maintain a seal between the artery 106b and channel 120b, thereby restricting passage of the power medium into the working chamber 22b. The position of the stem 136b and associated o-ring 137b does permit passage of the power medium being expelled from the working chamber 22b upon movement of the disc 46b and diaphragm 30 to pass through the channel 120b, the cavity 130b and out the vent 132b. In this manner the dual piston element 40 will begin its movement toward the pumping chamber 20a. It should be noted that the o-rings 50 seal the working chambers 22a, b from each other thus providing independent operation of the working chambers 22a, b.

As the movement of the dual piston element 40 toward the pumping chamber 20a continues, the negative pressure created with the pumping chamber 20b will cause fluid to enter the nozzle 76d and the orifice 26d thus filling the pumping chamber 20b. Fluid will not pass into the pumping chamber 20a at this point in time because the positive pressure in the chamber 20a will close the check valve 76c. Upon full movement of the dual piston element 40 toward the pumping chamber 20a the disc 46b will cause shifting of the pilot valve 64 and reorientation of the associated o-rings 68 and 70. At this point the chamber 20a is completely evacuated of fluid and the chamber 20b is completely filled with the fluid to be pumped.

As should be apparent, the reorientation of the o-rings 68 and 70 has two effects. First, the chamber 148b will be vented through the channels 154b, 156b, 60 and vent 158 thus causing a shift in the stem 136b to a position wherein the power medium may pass into the working chamber 22b via the channel 120b. Second, the power medium passing into the working chamber 22b will also pass through the channels 154a and 156a and into the cavity 148a thus causing a shift in the stem 136a to a position wherein no power medium will be permitted to pass into the working chamber 20a because of a seal between artery 106a an channel 120a. Rather, the power medium located within the working chamber 22a will be expelled by movement of the disc 46a and diaphragm 30 via the channel 120a, cavity 130 and vent 132a.

As the dual piston element 40 again begins to shift toward the pumping chamber 20b because of the filling of the working chamber 22b with the power medium, the fluid within the pumping chamber 20b will pass through the check valve 76b, the orifice 26b, the communicating channel 160 and out the nozzle 78a. No fluid will pass into the chamber 20a because of the check valve 76a. Similarly, no fluid will pass out the orifice 26d because of the check valve 76d. The negative pressure then being created within the pumping chamber 20a will cause fluid to pass through the nozzle 78d, the communicating channel 162 the orifice 26c, the check valve 76c and into the chamber 20a. Full movement of the dual piston element 40 in the direction of chamber 20b will again result in the configuration of FIG. 5. It should be noted that the discs 46a, b are stopped in their movement toward the center block 12 by the screws 164 and the pilot valve 64 is restricted in its movement by the washers 62. Thus, the full cycle of the reciprocating pump 10 of the present invention is illustrated.

Since both pumping chambers 20a, b are alternately operating with the orifices 26a and 26d through the fluid communicating holes 160 and 162 a steady, non-peak fluid pressure is achievable. Furthermore, the reciprocating nature and orientation of the stems 136a, b will always provide for the filling of alternate working chambers 22a, b and thus prevent the possibility of a stall condition. To facilitate this the vents 132a, b should be larger in diameter than the channels 120a, b, channels 154a, b, and channels 156a, b to prevent the creation of a back-pressure across the diaphragms 142a, b and thus their malfunction.

Although the present invention has been described in some detail, other modifications are possible without departing from the spirit of the invention. For example, the fluid communication holes 160 and 162 could be sealed and nozzles 78 installed in all of the orifices 26a, b, c, d. This would provide independent operation of the pump 10 to facilitate non-steady pumping of two fluids. Also, various orientations of the orifices 26a, b, c, d within the bells 14 are possible without affecting the performance of the pump 10.

Other additional advantages may accrue as a result of the constant pressure characterized by the action of the dual pumping chambers 20a, b. Primarily, the elimination of pressure peaks and the necessity of having relief valves or pressure sensing devices to protect downstream vending machine components is eliminated. Moreover, the internal components of the reciprocating pump 10 will endure substantially longer.

It will be noted that various other modifications may be made in the operational and structural details of the pump 10 without departing from the scope and spirit of the invention.

I claim:

1. In a fluid powered reciprocating pump having a housing, a first and a second pumping chamber, a first and a second working chamber, wherein said first working chamber is separated from said first pumping chamber by a first piston head, and wherein said second working chamber is separated from said second pumping chamber by a second piston head, a rod connecting said piston heads, said rod adapted for reciprocating movement between a first and a second position, the improvement comprising:
- a single supply line adapted to carry a power medium;
- a first duct adapted to carry said power medium from said supply line to said first working chamber;
- a second duct adapted to carry said power medium from said supply line to said second working chamber;
- a means for alternately closing said first and second ducts;
- a first channel adapted to carry said power medium from said first working chamber to said closing means;
- a second channel adapted to carry said power medium from said second working chamber to said closing means;
- a pilot valve operative upon reciprocating movement of said rod from said first position to said second position to cause movement of power medium from said first working chamber to said closing means through said first channel to close said second duct, and upon reciprocating movement of said rod from said second position to said first position to cause movement of power medium from said second working chamber to said closing means through said second channel to close said first duct.

2. The pump of claim 1 wherein said closing means comprises:
- a first cavity adapted to receive power medium from said second channel, said cavity having a first diaphragm and a first stem in operative association therewith to close said first duct;
- a second cavity adapted to receive power medium from said second channel, said cavity having a second diaphragm and a second stem in operative association therewith to close said second duct.

3. The pump of claim 2, wherein said first stem is biased into contact with said first diaphragm and said second stem is biased into contact with said second diaphragm.

4. The pump of claim 3 which includes a diaphragm attached to each piston head said diaphragms adapted to seal said working chambers from said pumping chambers.

5. The pump of claim 4 which includes a first check valve operative with each pumping chamber and adapted to alternately permit pumped fluid into each of said pumping chambers, and a second check valve operative with each pumping chamber and adapted to alternately permit pumped fluid out of each of said pumping chambers.

6. The pump of claim 5 which includes first fluid connecting means between said first check valves and second fluid connecting means between said second check valves.

7. The pump of claim 5 which is adapted to pump two fluids independently of each other.

8. In a fluid powered reciprocating pump having a housing, a first and a second pumping chamber, a first and a second working chamber, wherein said first working chamber is separated from said first pumping chamber by a first piston head, and wherein said second working chamber is separated from said second pumping chamber by a second piston head, a rod connecting said piston heads, said rod adapted for reciprocating movement between a first and a second position, the improvement comprising:
- a single supply line adapted to carry a power medium;
- a first duct adapted to carry said power medium from said supply line to said first working chamber;
- a second duct adapted to carry said power medium from said supply line to said second working chamber;
- a first closing chamber disposed between said supply line and said first duct, said first closing chamber having a first diaphragm disposed therein to form a first cavity, said first closing chamber also containing a first stem, said first stem biased into contact with said first diaphragm and said first stem having a means for closing said second duct;
- a second closing chamber disposed between said supply line and said second duct, said second closing chamber having a second diaphragm disposed therein to form a second cavity, said second closing chamber also containing a second stem, said second stem biased into contact with said second diaphragm, said second stem having a means for closing said second duct;
- a first channel operative to carry said power medium from said first working chamber to said second cavity;
- a second channel operative to carry said power medium from said second working chamber to said first cavity;
- a pilot valve operative upon reciprocating movement of said rod from said first position to said second position to cause movement of power medium from said first working chamber to said second cavity through said first channel to close said second duct and upon movement of said rod from said second position to said first position to cause movement of power medium from said second working chamber to said first cavity through said second channel to close said first duct;
- a means for venting said first and said second cavities;
- a means for venting said first and said second working chambers.

9. The pump of claim 8, wherein said pilot valve in said first position is operative to vent said second working chamber and said first cavity simultaneously upon filling of said first working chamber with power medium, and said pilot valve in said second position is operative to vent said first working chamber and said second cavity simultaneously upon filling of said second working chamber with power medium.

10. The pump of claim 9, wherein said first working chamber is adapted to vent through said first closing chamber, and said second working chamber is adapted to vent through said second closing chamber.

11. The pump of claim 10 which includes a diaphragm attached to each piston head said diaphragms adapted to seal said working chambers from said pumping chambers.

12. The pump of claim 11 which includes a first check valve operative with each pumping chamber and adapted to alternately permit pumped fluid into each of said pumping chambers, and a second check valve operative with each pumping chamber and adapted to alternately permit pumped fluid out of each of said pumping chambers.

13. The pump of claim 12 which includes first fluid connecting means between said first check valves and second fluid connecting means between said second check valves.

14. The pump of claim 12 which is adapted to pump two fluids independently of each other.

* * * * *